H. L. IRWIN.
HOSE AND PIPE COUPLING.
APPLICATION FILED APR. 5, 1911.

1,044,183.

Patented Nov. 12, 1912.

UNITED STATES PATENT OFFICE.

HARMON L. IRWIN, OF COLUMBUS GROVE, OHIO.

HOSE AND PIPE COUPLING.

1,044,183.  Specification of Letters Patent.  Patented Nov. 12, 1912.

Application filed April 5, 1911. Serial No. 619,059.

*To all whom it may concern:*

Be it known that I, HARMON L. IRWIN, a citizen of the United States, residing at Columbus Grove, in the county of Putnam and State of Ohio, have invented certain new and useful Improvements in Hose and Pipe Couplings, of which the following is a specification.

My invention relates to devices for coupling hose and pipe in the class of detachable couplings, and has for its object the provision of a device of the twin-coupling species consisting of a sleeve secured to the end of the hose, an internally threaded ring revolubly mounted on the sleeve and having an inwardly projecting flange that engages a flange on the exterior of the sleeve, and an exteriorly threaded ring engaging the flanged ring and provided with a plurality of hooks that engage the hooks on a similarly constructed coupling member on the end of the hose or pipe to be coupled thereto, the inner edges of the hooks being inwardly inclined to securely hold the hooks in engagement when the coupling is made, and the meeting ends of the sleeves formed with ground edges to make a water tight joint when the coupling is perfected.

My invention will be described in detail hereinafter and illustrated in the accompanying drawings in which—

Figure 1:
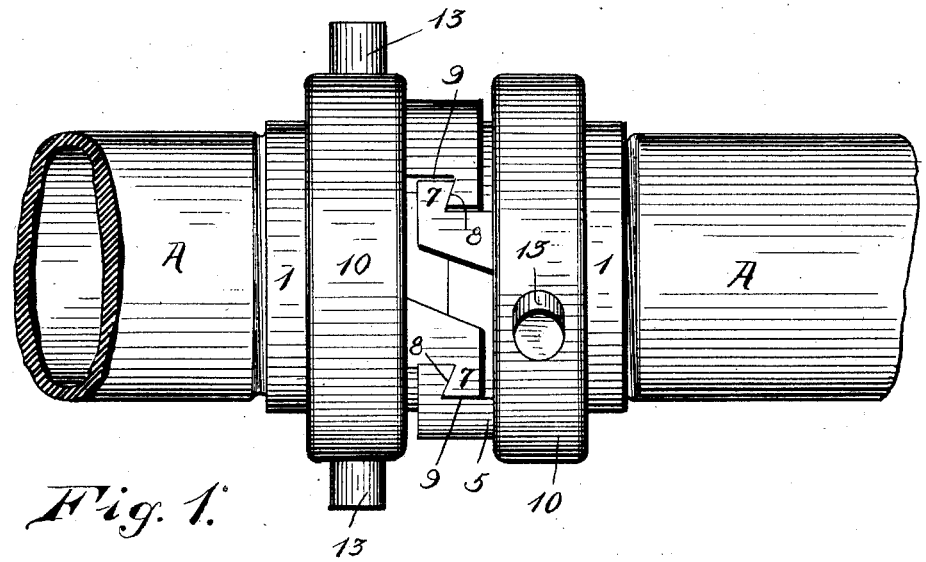
Figure 2:
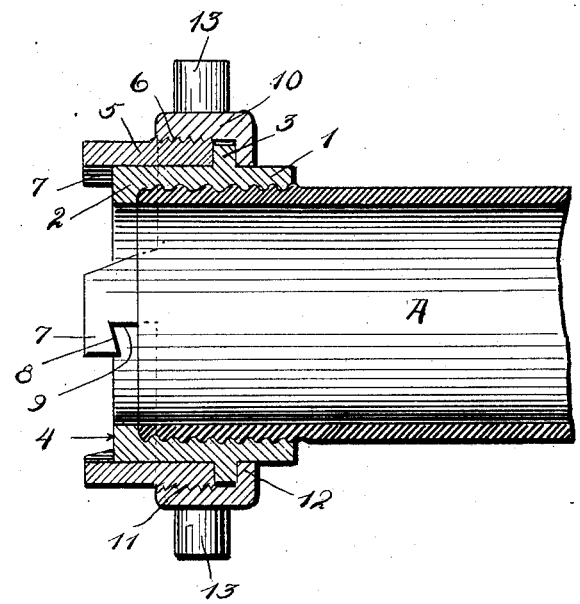

Figure 1 is a view of my improved coupling showing the ends of two hose pipes in a coupled position, and Fig. 2, a central longitudinal sectional view of one of the coupling members in an assembled position.

In the drawings similar reference characters will be used to indicate corresponding parts in all of the views.

My improved coupling consists of twin members each of which consists of a sleeve 1 to which the end of a length of hose or pipe A is secured, the end of the sleeve being formed with an inwardly extending shoulder 2 to engage the end of the hose or pipe A to limit its movement into the sleeve when securing the hose in position. The outer surface of the sleeve is formed with a circumferential flange 3 intermediate of its ends and the outer edge 4 of the sleeve is formed with a ground surface so that when the coupling is made, as shown in Fig. 1, the joint between the sleeves 1 is watertight.

5 indicates a ring slidably and revolubly mounted on sleeve 1 forward of flange 3 and having its outer surface provided with screw threads 6. The forward end of the ring 5 is formed with hook members 7, the hooks on said members all extending in the same direction and so arranged that when the tightening ring, to be hereinafter described, is screwed upon the ring 5, in clamping the hooks of two coupling members together, the hook portions if moved at all are moved toward one another to hold them more securely in engagement. The inner edge 8 of the hooks 7 are inclined inwardly so that the openings 9 of the hooks are dovetailed as shown, the opening between the end of the hook 7 and the ring being sufficiently wide to permit the end of the hook on the mating member to enter the opening. It will be apparent that this construction of the hooks provides a tight clamping position of the hooks when the coupling is made and prevents accidental breaking of the coupling. It will also be noted that the rear edges of the hook members are inclined and are adapted to engage one another when the coupling is unscrewed to prevent the movement of the hooks beyond their disengaged position.

10 indicates the tightening ring referred to above that is interiorly threaded as shown at 11 and engaging threads 6 on ring 5. The rear end of ring 10 is formed with a flange 12 that engages flange 3 to limit the forward movement of the ring, and 13 indicates lugs on the outer side of the ring to engage a spanner wrench in tightening the coupling.

The operation of my invention will be apparent from the above description and the drawings, it also being apparent that the coupling can be made very quickly and when made cannot be broken accidentally, but can be released as quickly as made when desired.

While I have shown my coupling with four hooks on each member it will be understood that this number may be varied as desired without altering the spirit of my invention.

Having thus described my invention what I claim is—

1. A hose coupling consisting of two mating members, each member comprising a sleeve adapted for engagement with a hose, an annular flange intermediate of its ends and integral therewith, an internally screw-threaded ring slidably and revolubly mounted on said sleeve and provided with a laterally extending flange with its inner face formed smooth to bear against the periphery of the first named flange, and further provided with studs projecting therefrom to form a hand grip, a second ring slidably and revolubly mounted upon said sleeve and externally screw-threaded for engagement with the internally screw-threaded ring; and a plurality of hook members formed integrally on said second mentioned ring, each of said hook members having an inwardly inclined portion forming a dove-tail opening between the hook and the body of the ring, said inclined portions of the hooks being adapted to engage one another when the coupling is perfected.

2. A hose coupling consisting of two mating members, each member comprising a sleeve adapted for engagement with a hose, an annular flange intermediate of its ends and integral therewith, an internally screw-threaded ring slidably and revolubly mounted on said sleeve and provided with a laterally extending flange with its inner face formed smooth to bear against the periphery of the first named flange, and further provided with studs projecting therefrom to form a hand grip, a second ring slidably and revolubly mounted upon said sleeve and externally screw-threaded for engagement with the internally screw-threaded ring; and a plurality of hook members formed integrally on said second mentioned ring, each of said hook members having an inwardly inclined portion forming a dove-tail opening between the hook and the body of the ring, said inclined portions of the hooks being adapted to engage one another when the coupling is perfected, said hook members being further provided with rear inclined portions for engagement with one another when the coupling is unscrewed to prevent the movement of the hooks beyond their disengaged position.

In testimony whereof I hereto affix my signature in the presence of two witnesses.

HARMON L. IRWIN.

Witnesses:
G. W. SAUNDERS,
ELIZABETH FORMON.

---

Copies of this patent may be obtained for five cents each, by addressing the " Commissioner of Patents, Washington, D. C."